United States Patent
Tsubota

(10) Patent No.: US 12,460,915 B2
(45) Date of Patent: Nov. 4, 2025

(54) ANGLE ERROR CORRECTION DEVICE

(71) Applicant: RENESAS ELECTRONICS CORPORATION, Tokyo (JP)

(72) Inventor: Masashi Tsubota, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 454 days.

(21) Appl. No.: 17/828,359

(22) Filed: May 31, 2022

(65) Prior Publication Data

US 2023/0384082 A1    Nov. 30, 2023

(51) Int. Cl.
*G01B 7/30* (2006.01)
*H02P 6/17* (2016.01)

(52) U.S. Cl.
CPC . *G01B 7/30* (2013.01); *H02P 6/17* (2016.02)

(58) Field of Classification Search
CPC . G01B 7/30; G01D 3/02; G01D 5/145; G01D 5/204; H02P 6/17; G05B 2219/41132
See application file for complete search history.

(56) References Cited

U.S. PATENT DOCUMENTS

| | | | |
|---|---|---|---|
| 10,895,866 B1* | 1/2021 | Bae | H02K 29/06 |
| 2005/0033547 A1* | 2/2005 | Morishita | H02K 29/06 |
| | | | 702/147 |
| 2006/0125439 A1* | 6/2006 | Ajima | B60K 6/48 |
| | | | 318/716 |
| 2008/0112697 A1* | 5/2008 | Kim | G05B 19/416 |
| | | | 388/823 |
| 2009/0254300 A1* | 10/2009 | Schneider | G01P 3/48 |
| | | | 702/145 |
| 2011/0127938 A1* | 6/2011 | Kawakami | G01P 3/481 |
| | | | 318/400.13 |
| 2012/0112672 A1* | 5/2012 | Niimi | G01D 5/24476 |
| | | | 318/400.04 |
| 2018/0054144 A1* | 2/2018 | Mohanaveeramani | H02M 1/12 |
| 2020/0228034 A1* | 7/2020 | Kokal | H02P 29/50 |
| 2022/0146288 A1* | 5/2022 | Cachro | G01D 5/3473 |

FOREIGN PATENT DOCUMENTS

JP    2012-042411 A    3/2012

OTHER PUBLICATIONS

JP2012042411A English Translation (Year: 2012).*

* cited by examiner

*Primary Examiner* — Kyle R Quigley
(74) *Attorney, Agent, or Firm* — Rimon P.C.

(57) ABSTRACT

An angle error correction device includes an actual rotation angle measurement circuit that converts a rotation angle information of a rotation angle detection target to an angle counter value for each predetermined angle; an actual speed calculator that calculates an actual rotation speed for each predetermined angle from the angle counter value; a curve interpolation circuit that generates a curve interpolation equation from the angle counter value; an ideal speed estimator that calculates an estimated ideal rotation speed for each predetermined angle using the curve interpolation equation; an angle error detector that calculates an angle error for each predetermined angle by integrating an angle ripple ratio determined by the actual rotation speed and the estimated ideal rotation speed; an angle error table in which the angle error calculated by the angle error detector is stored; and a correction circuit that corrects the rotation angle information using the angle error table.

5 Claims, 15 Drawing Sheets

FIG. 2
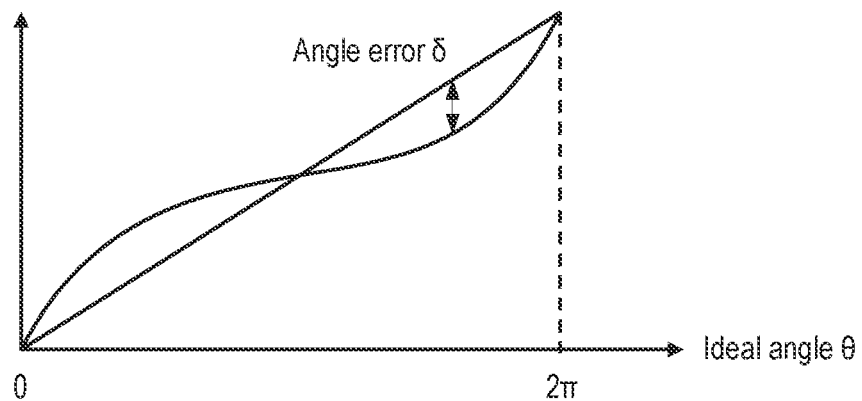
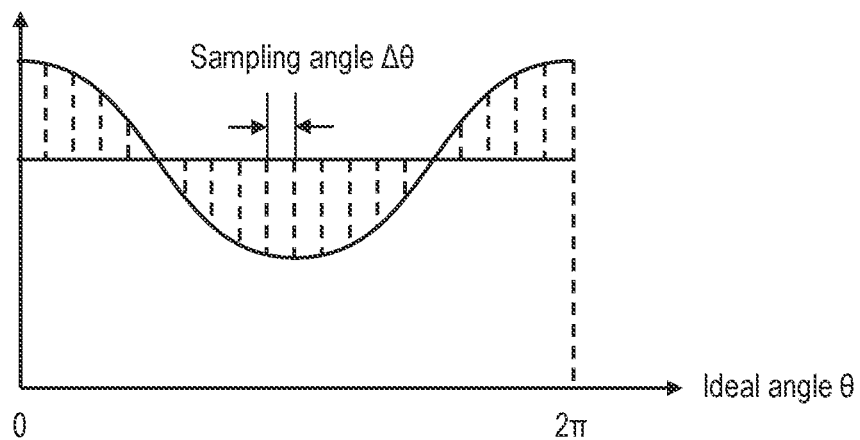
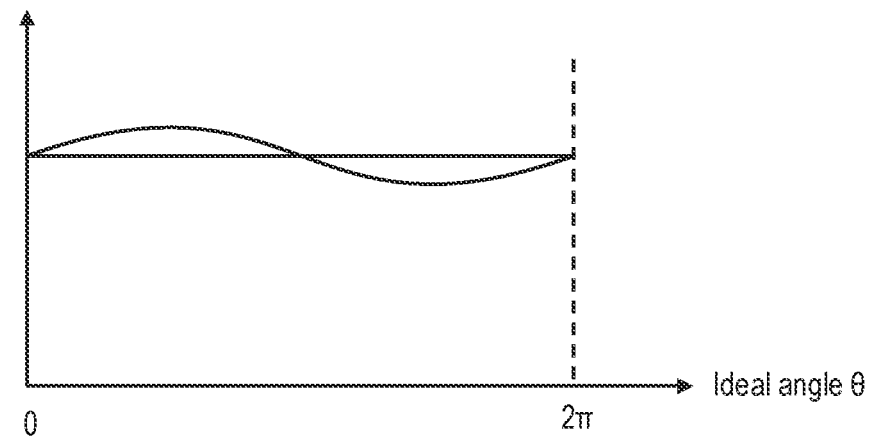

ANGLE ERROR CORRECTION DEVICE

BACKGROUND

The present invention relates to an angle error correction apparatus for an angle sensor of the rotating device such as a motor.

Recently, for a driving motor control and a steering motor control for an electric vehicle (EV) or a hybrid electric vehicle (HEV), a high-precision and low-cost control device is required. In order to perform high-precision motor control, a high-precision rotation angle detection system is essential.

In the automobile engine room, noises caused by inverters and motors are likely to be generated. In this environment, errors of the sensor itself such as a resolver, errors of the eccentricity and mounting position of the rotor and errors due to an interface circuitry and RDC (Resolver Digital Converter) in the rotational angle detection system occur. In addition, temperature-dependent errors during operation also occur in these devices. These errors cause a speed ripple, noise, vibration, abnormal current, and lowering in efficiency of the motor.

Therefore, high accuracy rotation angle detection system of suppressing the errors is desired.

Patent Document 1 discloses a technique of calculating the rotation angle $\theta'$ by calculating the rotation speed average value from the detected rotation angle $\theta$ and integrating the rotation speed average value.

PRIOR-ART DOCUMENT

Patent Document

[Patent Document 1] Japanese Unexamined Publication Laid-Open No. 2012-42411

SUMMARY

However, in the technique disclosed in Patent Document 1, the correction of the error is not sufficient. For example, if the motor accelerates and decelerates rapidly, there is a possibility that the error becomes large.

Other objects and novel features will become apparent from the description of the specification and drawings.

An angle error correction device includes an actual rotation angle measurement circuit that converts a rotation angle information of a rotation angle detection target to an angle counter value for each predetermined angle; an actual speed calculator that calculates an actual rotation speed for each predetermined angle from the angle counter value; a curve interpolation circuit that generates a curve interpolation equation from the angle counter value; an ideal speed estimator that calculates an estimated ideal rotation speed for each predetermined angle using the curve interpolation equation; an angle error detector that calculates an angle error for each predetermined angle by integrating an angle ripple ratio determined by the actual rotation speed and the estimated ideal rotation speed; an angle error table in which the angle error calculated by the angle error detector is stored; and a correction circuit that corrects the rotation angle information using the angle error table.

According to the present invention, it is possible to perform an angle error correction while suppressing the error.

BRIEF DESCRIPTION OF THE DRAWINGS

FIG. 2 is a diagram for explaining an angular error.

DETAILED DESCRIPTION

Figure 1:
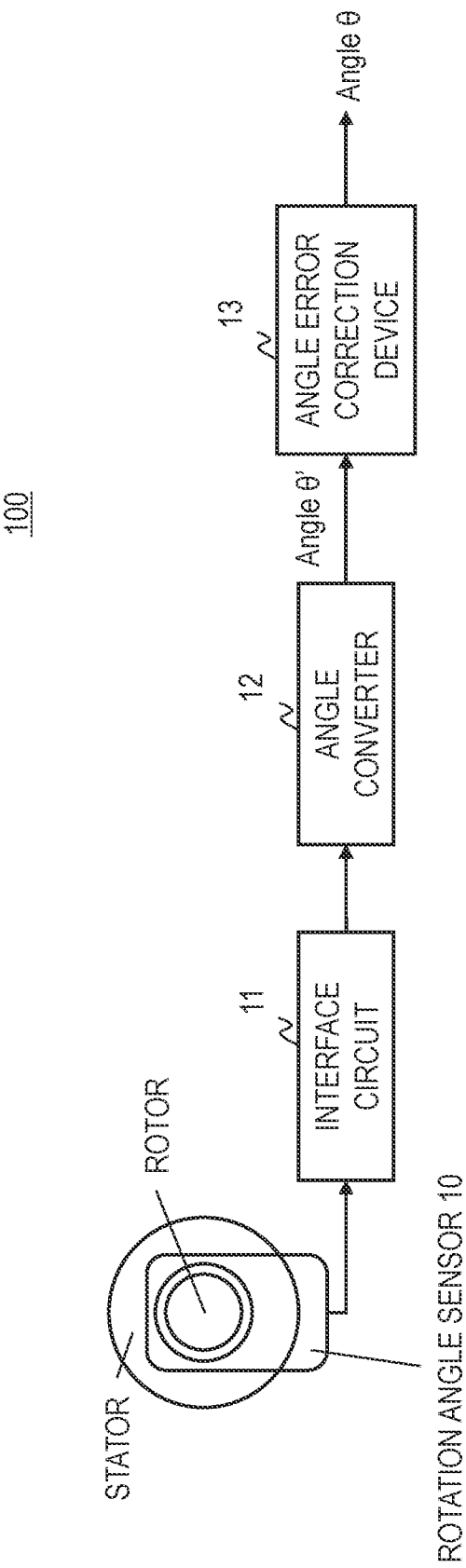
FIG. 1 is a block diagram of a rotation angle detection system according to a first embodiment.

Hereinafter, an angle error correction device according to an embodiment will be described in detail by referring to the drawings. In the specification and the drawings, the same or corresponding form elements are denoted by the same reference numerals, and a repetitive description thereof is omitted. In the drawings, for convenience of description, the configuration may be omitted or simplified. Also, at least some of the embodiments may be arbitrarily combined with each other.

First Embodiment

FIG. 1 is a block diagram of a rotation angle detection system 100 according to the first embodiment. As shown in FIG. 1, the rotation angle detection system 100 includes a rotation angle sensor 10, an interface circuit 11, an angle converter 12 and an angle error correction device 13.

Rotation angle sensor 10 is a sensor for detecting a rotation angle of a rotation angle detection target such as a motor.

Specifically, the rotation angle sensor 10 is a resolver, a magnetic sensor, a Hall sensor, or the like. Hereinafter, the rotation angle sensor 10 will be described with a resolver connected to the motor (rotor).

The angle converter 12 is a device for converting an output signal from the rotation angle sensor 10 via the interface circuit 11 to a rotation angle $\theta'$.

Angle error correction device 13 is a device for outputting a rotation angle $\theta$ by correcting an error included in the rotation angle $\theta'$ outputted from the angle converter 12.

In the first embodiment, the angle error correction device 13 is characterized. Since the rotation angle sensor 10, the interface circuit 11 and the angle converter 12 are conventional devices, details thereof will be omitted.

Before explaining the operation of the angle error correction device 13, the error will be described. FIG. 2 shows a relationship between the ideal rotation angle (rotation angle excluding the error) θ and the measured rotation angle θ'. FIG. 2 shows a mechanical angle. The waveform of FIG. 2 is repeated every one rotation period of the motor. For the ideal rotation angle θ and the measured rotation angle θ', the following equation (1) is established.

$$\theta' = \theta + \sum_{k=1}^{n}\{\delta_0 + \delta_k \sin(k\theta + \varphi_k)\}$$

Here, k is the order, φ is the phase of the error, $\delta_0$ is a DC component error, and "$\delta_k \sin(k\theta+\varphi_k)$" is an AC component error.

When the ideal rotational speed of the motor is ω, θ=ωt, ω=dθ/dt. Thus, the equation (1) becomes the following equation (2).

$$\frac{\omega'}{\omega} = 1 + \sum_{k=1}^{n} \delta_k k \cos(k\theta + \varphi_k)$$

ω'/ω is also referred to as a velocity ripple rate.
Integral equation (2) yields the following equation (3).

$$\int_0^{2\pi}\left(\frac{\omega'-\omega}{\omega}\right)d\theta = \int_0^{2\pi}\sum_{k=1}^{n}\delta_k k\cos(k\theta+\varphi_k)d\theta = \sum_{k=1}^{n}\delta_k\sin(k\theta+\varphi_k)$$

From equation (3), it can be seen that the AC component error can be obtained by integrating the velocity ripple ratio. Angle error correction device 13 of the first embodiment performs correction of the angle error using the AC component error obtained by the integral of the velocity ripple ratio.

Figure 3:
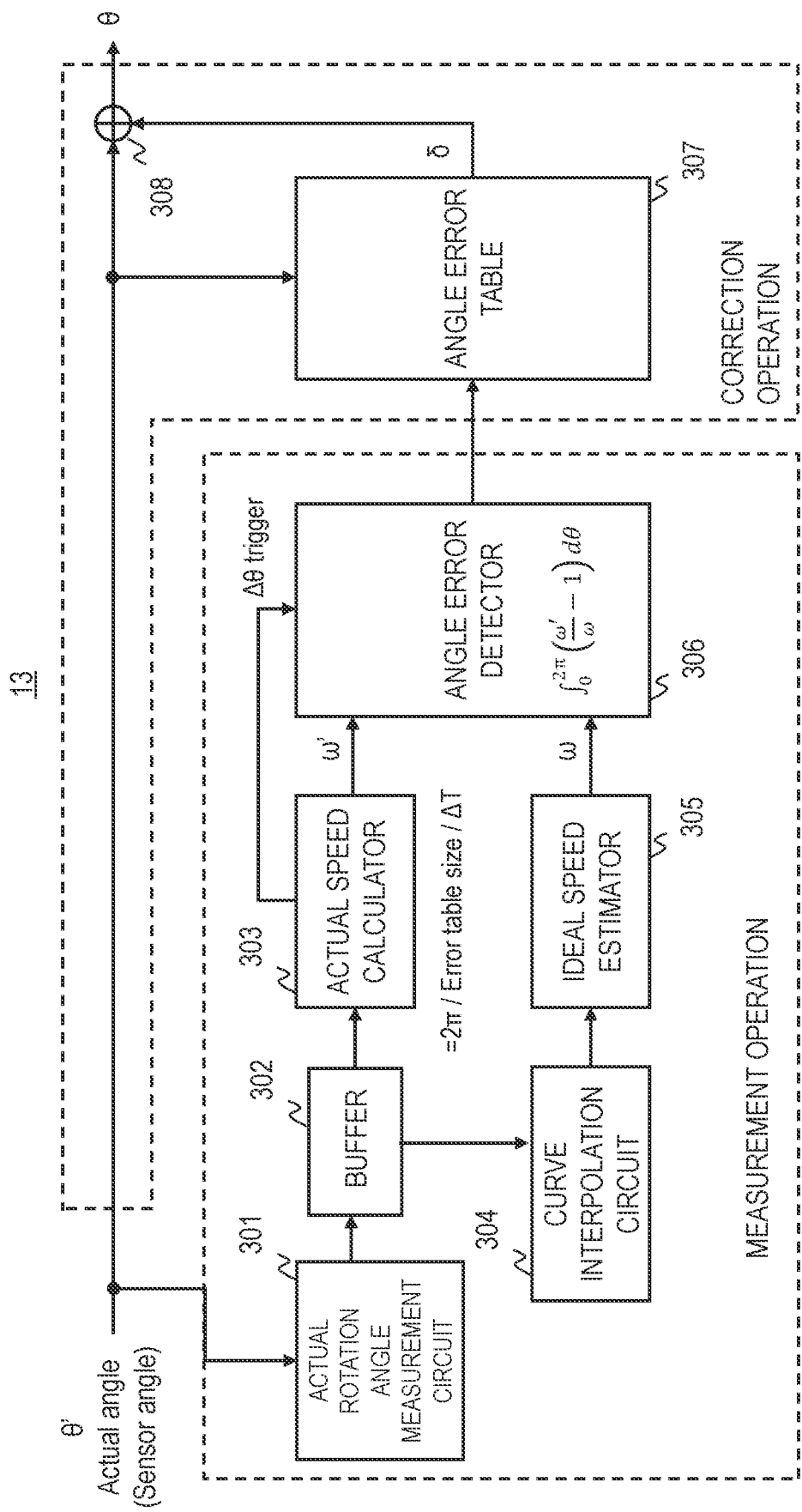
FIG. 3 is a block diagram of the angle error correction device according to the first embodiment.

FIG. 3 is a block diagram of the angle error correction device 13. As shown in FIG. 3, the angle error correction device 13 includes an actual rotation angle measurement circuit 301, a buffer 302, an actual speed calculator 303, a curve interpolation circuit 304, an ideal speed estimator 305, an angle error detector 306, an angle error table 307 and a correction circuit (calculator) 308.

In this specification, the rotation speed is also simply referred to as a speed. The angle of rotation is simply referred to as the angle.

Actual rotation angle measurement circuit 301 converts the rotation angle θ' outputted from the angle converter 12 (measured by the rotation angle sensor 10) into an angle counter value (time information by a timer counter), and stores the angle counter value for each constant Δθ in the buffer 302. Δθ is, for example, 2π/2048. The buffer 302 stores information for one rotation period, that is, 2048 angle counter values. Here, as the rotation angle sensor 10, a resolver of four poles is assumed. Electrical angle=Mechanical angle*4. Therefore, when Δθ is considered as an electric angle, Δθ is 2π (electric angle)/512. 2048 and 512 are also referred to as table sizes of the angle error table 307.

Actual speed calculator 303 is a circuit for calculating the actual speed ω' for each Δθ. Actual speed calculator 303 reads the angle counter values stored in the buffer 302 in order from a predetermined angle (electrical angle 0, 2π), and calculates the actual rotation speed ω'. Here, ω'=2π (electrical angle)/angle error table size (512)/ΔT (angle counter value).

Curve interpolation circuit 304 is a circuit for creating a curve interpolation equation (parameter) for obtaining the estimated ideal rotation speed ω for each Δθ. Curve interpolation circuit 304 reads the angle counter values for three cycles (current cycle, one cycle before, two cycles before) corresponding to a specific angle (e.g., electrical angle 2π. also referred to as a specific angle) from the buffer 302 and calculates the respective rotational speed. Curve interpolation circuit 304 further creates a curve interpolation. equation from the calculated three rotational speeds. As the curve interpolation, quadratic function, cubic spline function, etc. are used.

The ideal rotational speed estimator 305 obtains an estimated ideal rotational speed ω for each Δθ by the created curve interpolation equation.

Angle error detector 306, by performing the processing of Equation (2) (3), calculates the angle error for each Δθ. That is, the angle error detector 306 obtains the speed ripple ratio from the actual rotation speed ω' and the estimated ideal rotation speed ω calculated for each Δθ, and calculates the angle error by integrating the speed ripple ratio. Angle error calculated for each Δθ for one rotation period is stored in the angle error table 307. The angle error table information stored in a built-in or external memory (not shown) of the angle error correction device 13.

Next, the operation of the angle error correction device 13 will be described. The angle error correction device 13 has two modes of operation. The first mode of operation is a measurement operation. The second mode of operation is a correction operation. Measurement operation is an operation of creating an angle error table from the measured actual rotation angle θ'. As described above, by performing the measurement operation, angle errors, for example, for every 2π (electrical angle)/512 are stored in the angle error table. The angle error table is updated every one rotation cycle.

The correction operation, with respect to the measured actual rotation angle θ', performs angle error correction using the angle error table and outputs the rotation angle θ. Rotation angle θ is a final output of the rotation angle detection system 100. Specifically, when the actual rotation angle θ' is input to the angle error table, the angle error δ is output from the angle error table. The rotation angle θ is obtained by subtracting the angle error δ from the measured actual rotation angle θ' by the correction circuit 308.

That is, the angle error correction device 13 of the first embodiment, while creating and updating the angle error table in accordance with the measured actual rotation angle θ', performs angle error correction.

Figure 4:
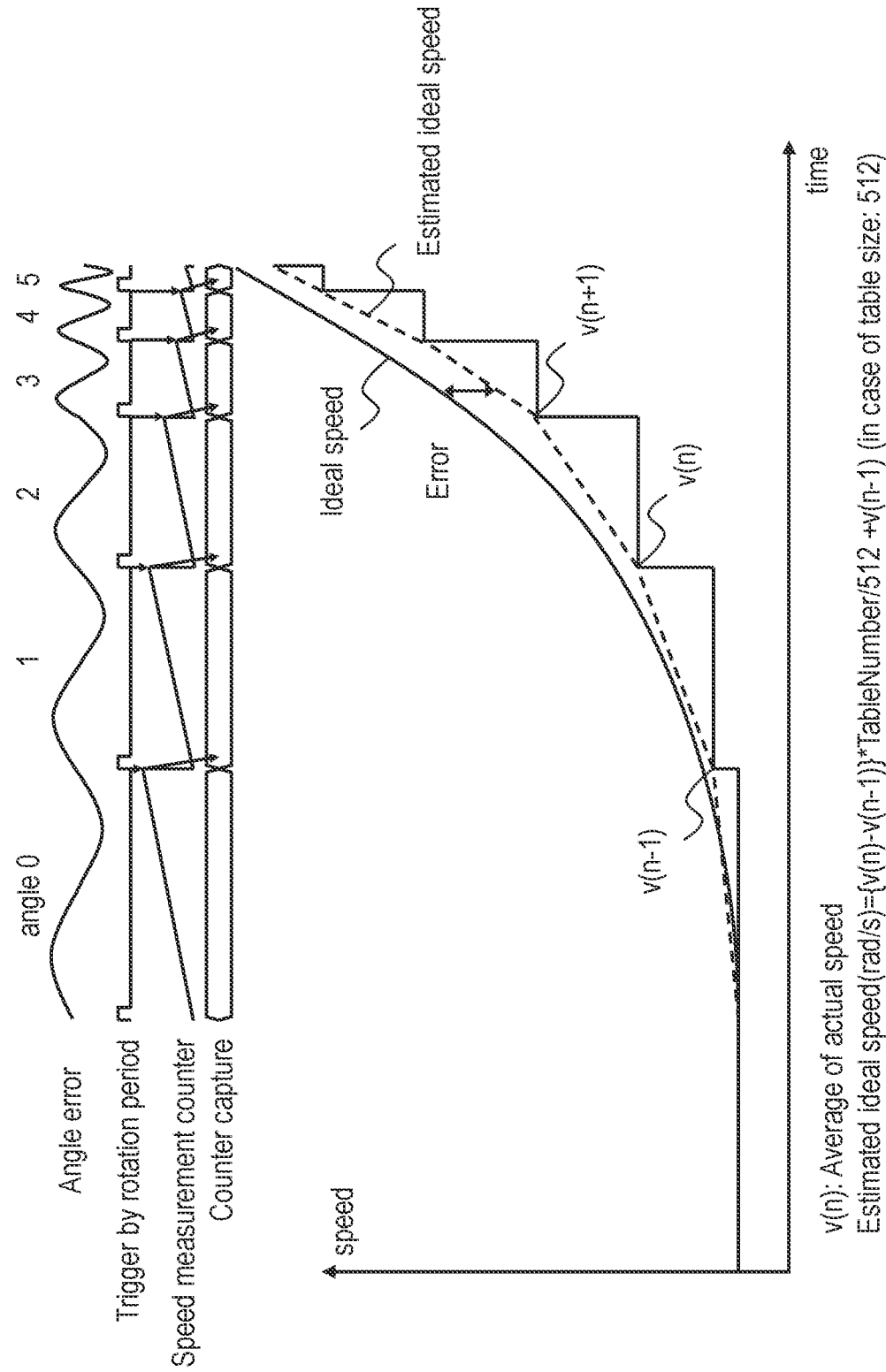
FIG. 4 is a timing chart for explaining the operation of a comparative example of the angle error correction device according to the first embodiment.
Figure 5:
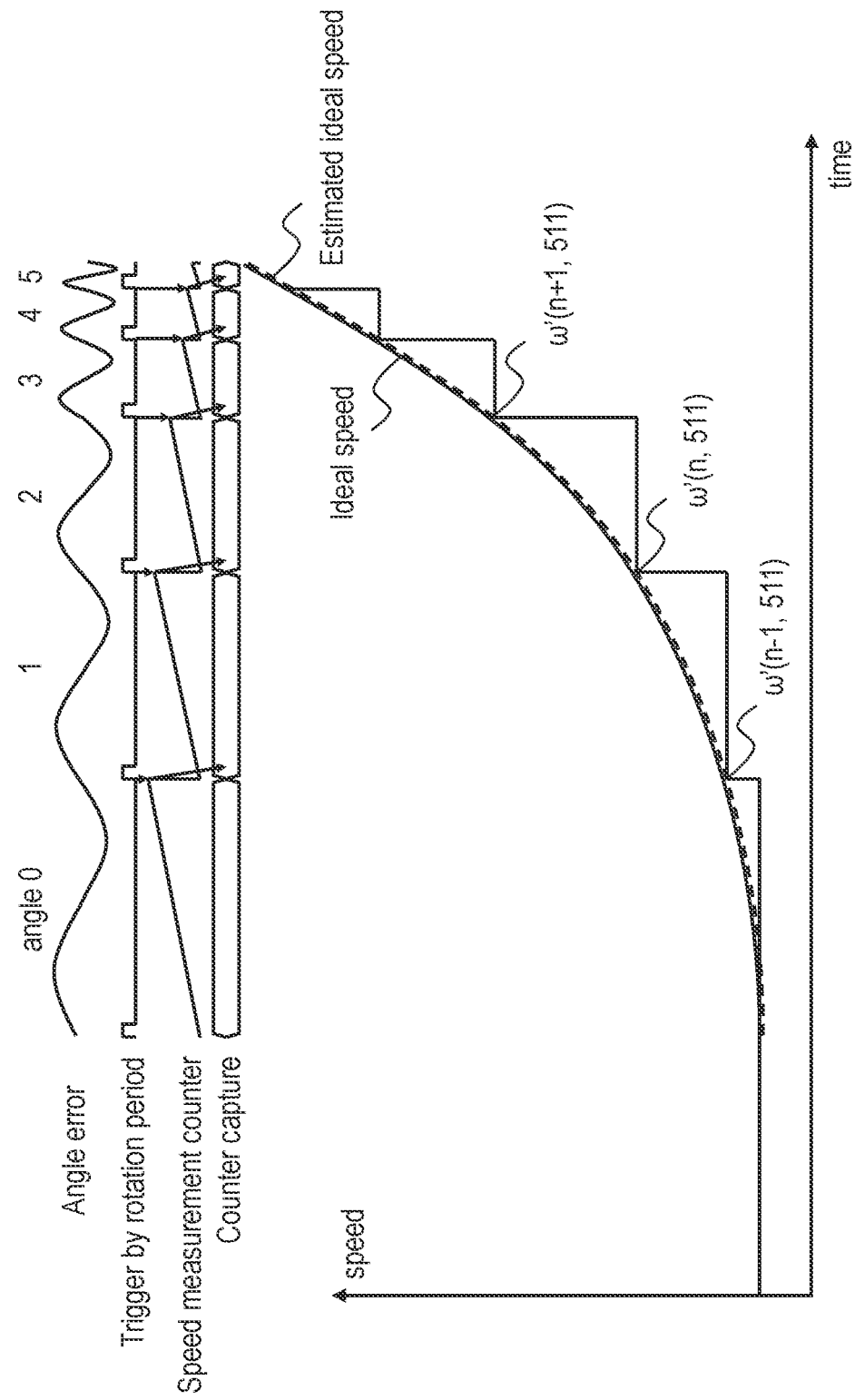
FIG. 5 is a timing chart for explaining the operation of the angle error correction device according to the first embodiment.

Next, an effect of the angle error correction device 13 according to the first embodiment will be described with reference to FIGS. 4 and 5. First, in order to make the effect of the first embodiment easy to understand, a comparative example will be described. FIG. 4 is a diagram for explaining the operation of the comparative example. Comparative example, unlike the first embodiment, calculates the estimated ideal rotational speed ω for each Δθ using the average value of the actual rotational speed ω' for each Δθ and linear interpolation. As is apparent from FIG. 4, in the method of the comparative example, when the motor accelerates rapidly (or decelerates), the difference between the estimated ideal rotational speed ω and the ideal rotational speed becomes large.

On the other hand, in the first embodiment, a curve interpolation equation is created from three rotational speeds, and the estimated ideal rotational speed ω for each Δθ is calculated by curve interpolation. Therefore, as shown in FIG. 5, even if the motor accelerates rapidly (or decelerates), it is possible to suppress the difference between the estimated ideal rotational speed ω and the ideal rotational speed.

As described above, the angle error correction device 13 according to the first embodiment calculates, from the measured actual rotation angle θ', the actual rotation speed ω' for each Δθ and the estimated ideal rotation speed ω for each Δθ using the curve interpolation. Furthermore, using the angle error table created from the actual rotation speed ω' and the estimated ideal rotation speed ω for each Δθ, the angle error correction is performed. Thus, it is possible to detect the rotation angle to suppress the error caused by the rapid acceleration and deceleration of the motor.

Incidentally, the actual rotation angle measurement circuit 301, the actual speed calculator 303, the curve interpolation circuit 304, the ideal speed estimator 305 and the angle error detector 306 may be replaced by a CPU and a program executed by the CPU.

Second Embodiment

Figure 6:
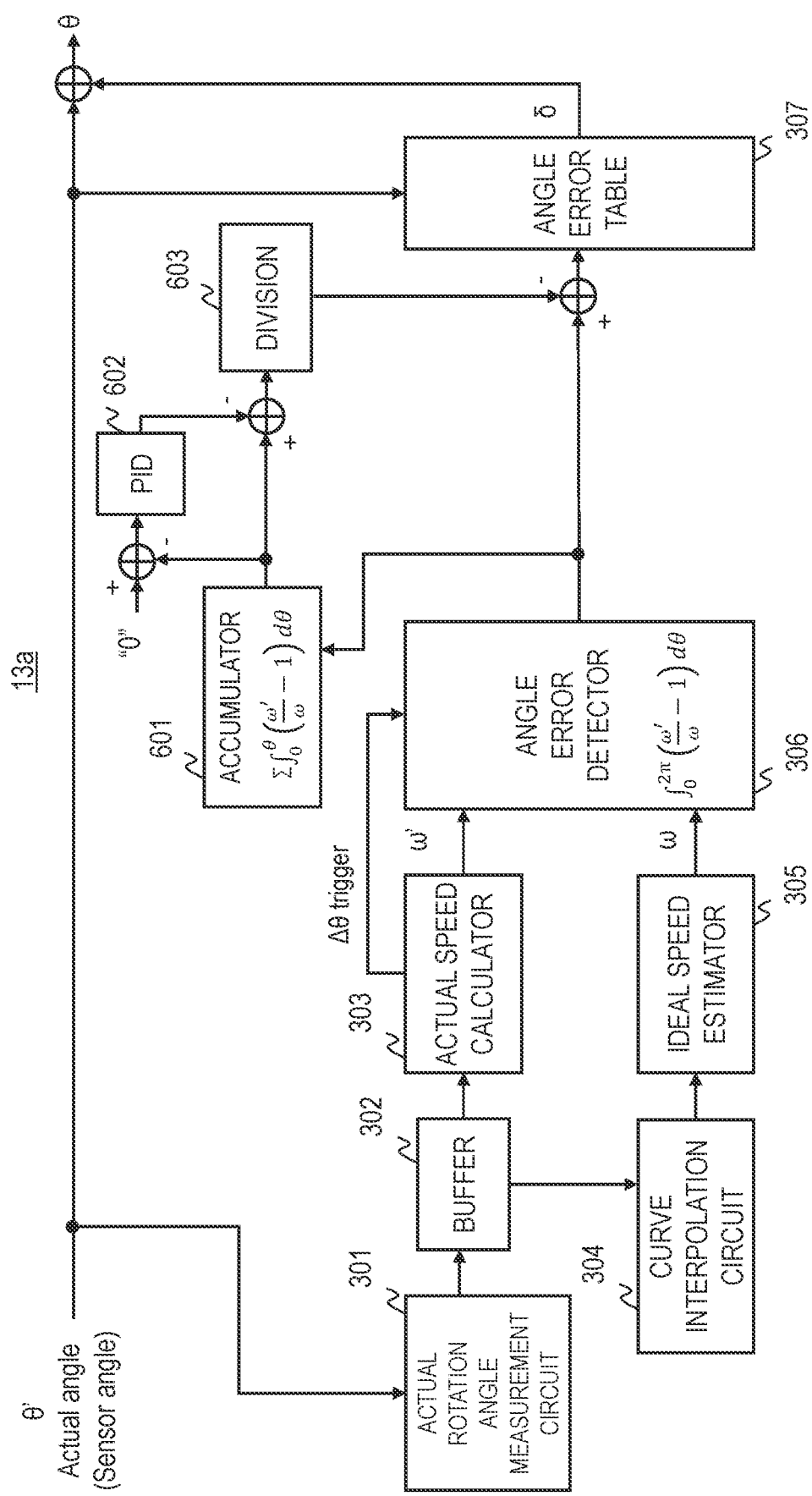
FIG. 6 is a block diagram of an angle error correction device according to a second embodiment.

FIG. 6 is a block diagram of the angle error correction device 13a according to the second embodiment. A difference from the first embodiment is that an accumulator 601, a Proportional Integral Differential (PID) control circuit 602, and a division circuit 603 are added.

Figure 7:
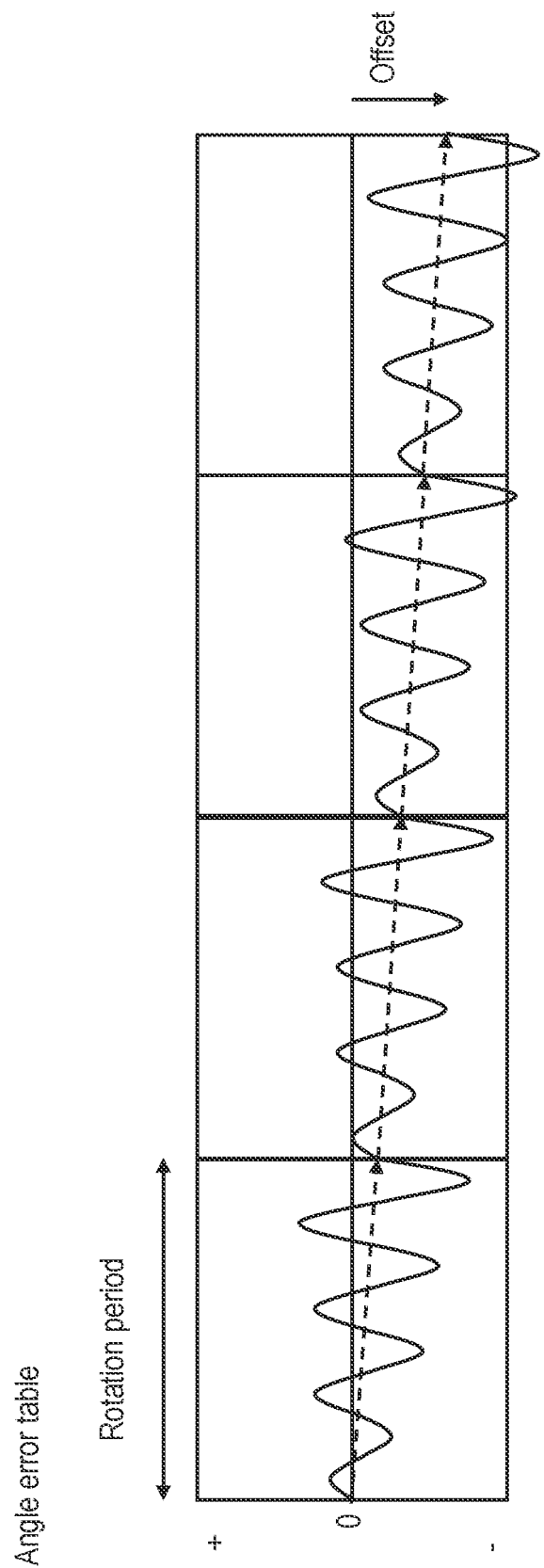
FIG. 7 is a diagram for explaining the operation of the angular error correction device according to the second embodiment.

In the first embodiment, due to using the angle count value, there is a possibility that a minimum count error of the timer counter occurs. Further, there is a possibility that a round mark error of the numerical value in the calculation is integrated and an abnormal angle is stored in the angle error table. These errors can be considered as DC component offsets. FIG. 7 is an image diagram in which DC component offsets are accumulated in the information stored in the angle error table. In the second embodiment, these DC component offsets are suppressed.

Accumulator 601 accumulates the angle errors for one rotation period. PID control circuit 602 performs PID control so that the accumulated value becomes 0. Division circuit 603 is a circuit for performing a predetermined operation (described later) to the accumulated value.

Figure 8:
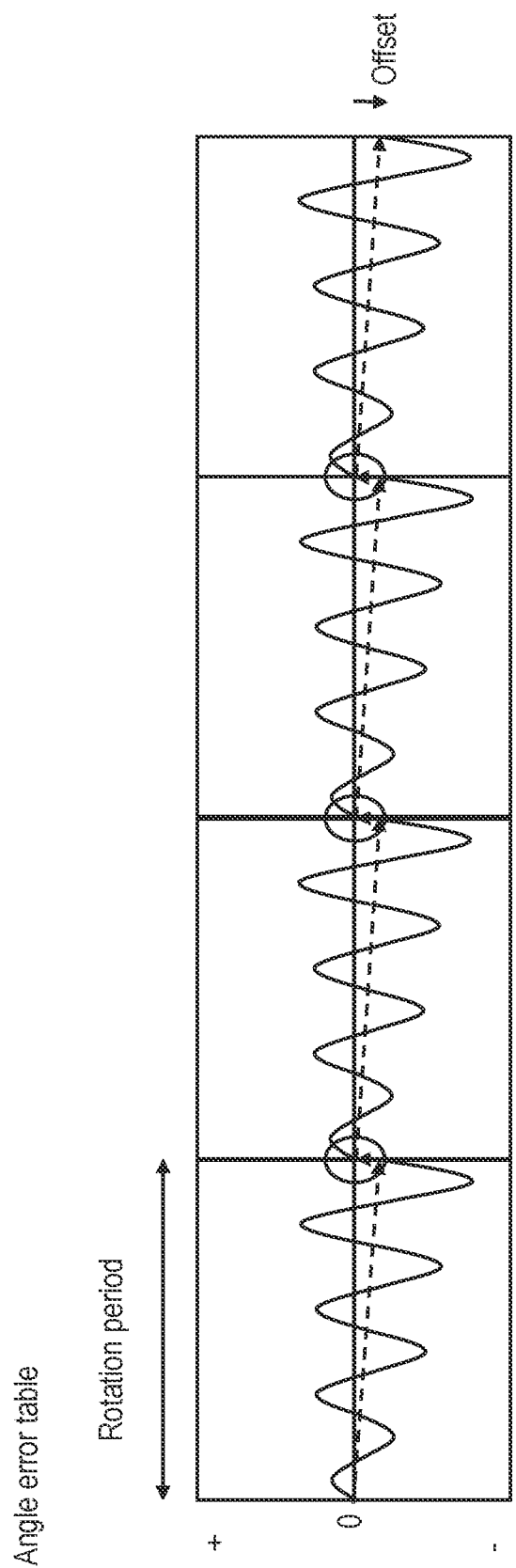
FIG. 8 is a diagram for explaining the operation of the angular error correction device according to the second embodiment.

FIG. 8 is an operation image diagram of the second embodiment. The accumulator 601 accumulates the angle errors for one rotation period. Division circuit 603 calculates an average value of the angle errors for one rotation period. The average value is expressed by the following equation (4).

$$\frac{\Sigma(n*m \text{ angle error values})}{n*m}$$

Where n is the angle error table size (e.g., 512), m is the sensor period corresponding to one rotation period of the motor (m=4: 4-pole resolver).

The calculated average value is subtracted from a first angle error value among angle error values calculated in the next rotation period. That is, the average value calculated in the first rotation period is subtracted from the first angle error value for the second rotation period. The same applies to a third and subsequent rotation cycles. Thus, the DC component offset can be suppressed.

Instead of subtracting the calculated average value from one angle error value for each rotation period, it may be subtracted a value corresponding to the average value from the n*m angle error values at each angle error calculation. More specifically, a value represented by the following equation (5) is subtracted from each of the n*m angle error values. The division circuit 603 performs an operation of Equation (5).

$$\frac{\Sigma(n*m \text{ angle error values})/n*m}{n*m}$$

Figure 9:
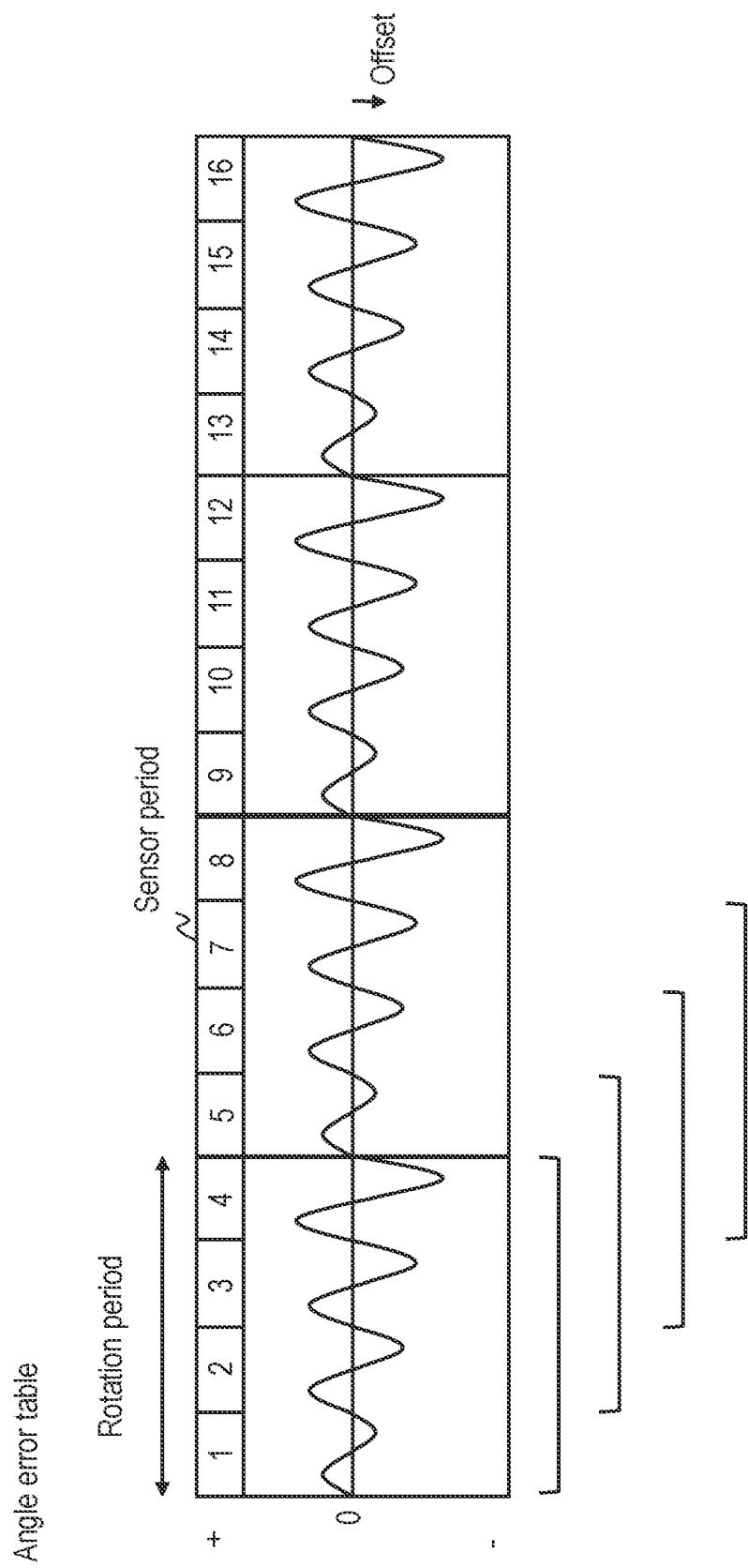
FIG. 9 is a diagram for explaining the operation of the angular error correction device according to the second embodiment.

Alternatively, the accumulated value may be a moving accumulated value. FIG. 9 is an operation image diagram of the moving accumulated value. In FIG. 9, the accumulated value of the sensor periods 1 to 4 calculated, and the value of the equation (5) is subtracted from each angle error value of the sensor periods 5 to 8. Next, the accumulated value of the sensor periods 2 to 5 is calculated, and the value of the equation (5) is subtracted from each angle error value of the sensor periods 6 to 9. Thereafter, the moving accumulation and subtraction are performed in the same manner.

As described above, the angle error correction device 13a according to the second embodiment can suppress the DC component offset.

Third Embodiment

Figure 10:
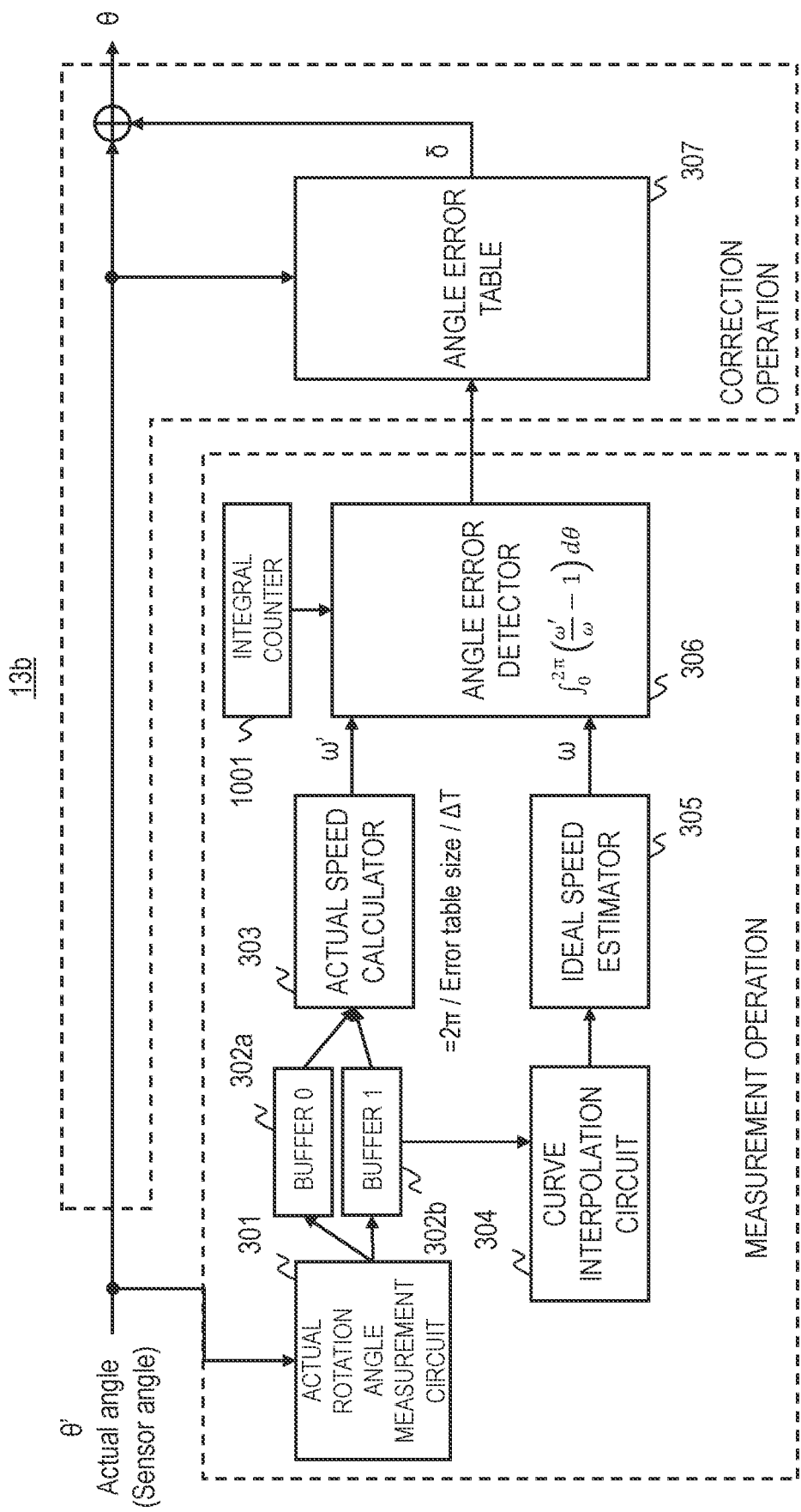
FIG. 10 is a block diagram of an angle error correction device according to a third embodiment.

FIG. 10 is a block diagram of an angle error correction device 13b according to third embodiment. A difference from the first embodiment is that the buffer 302 is divided into the buffer 0 (302a) and the buffer 1 (302b). An integral counter 1001 is added.

As described above, the angle counter value for each Δθ is stored in the buffer 302, and the angle error table is generated based on the stored angle counter values. Assume that the motor rotates at a high speed. In this case, since the writing speed of the angle counter value to the buffer 302 also increases, there is a possibility that the angle error table may not be created in time within one rotation period. In some cases, it is possible to cope with increasing a processing speed of each circuit in the angle error correction device 13 (e.g. increasing a processing speed of the CPU) but another countermeasure is necessary. Angle error correction device 13b of the third embodiment provides this countermeasure technique.

The actual rotation angle measurement circuit 301 alternately switches between buffer 0 and buffer 1 for each rotation period to store the angular counter value for each Δθ. That is, 2048 (512*4) angle counter values are stored in the buffer 0 and the buffer 1, respectively.

As described in the first embodiment, the actual speed calculator 303, the curve interpolation circuit 304, the ideal speed estimator 305, the angle error detector 306 read the angle counter value from the buffer 0 or buffer 1, to create an angle error table. The integral counter 1001 is down-counted each time one angle error value is generated.

Figure 11:
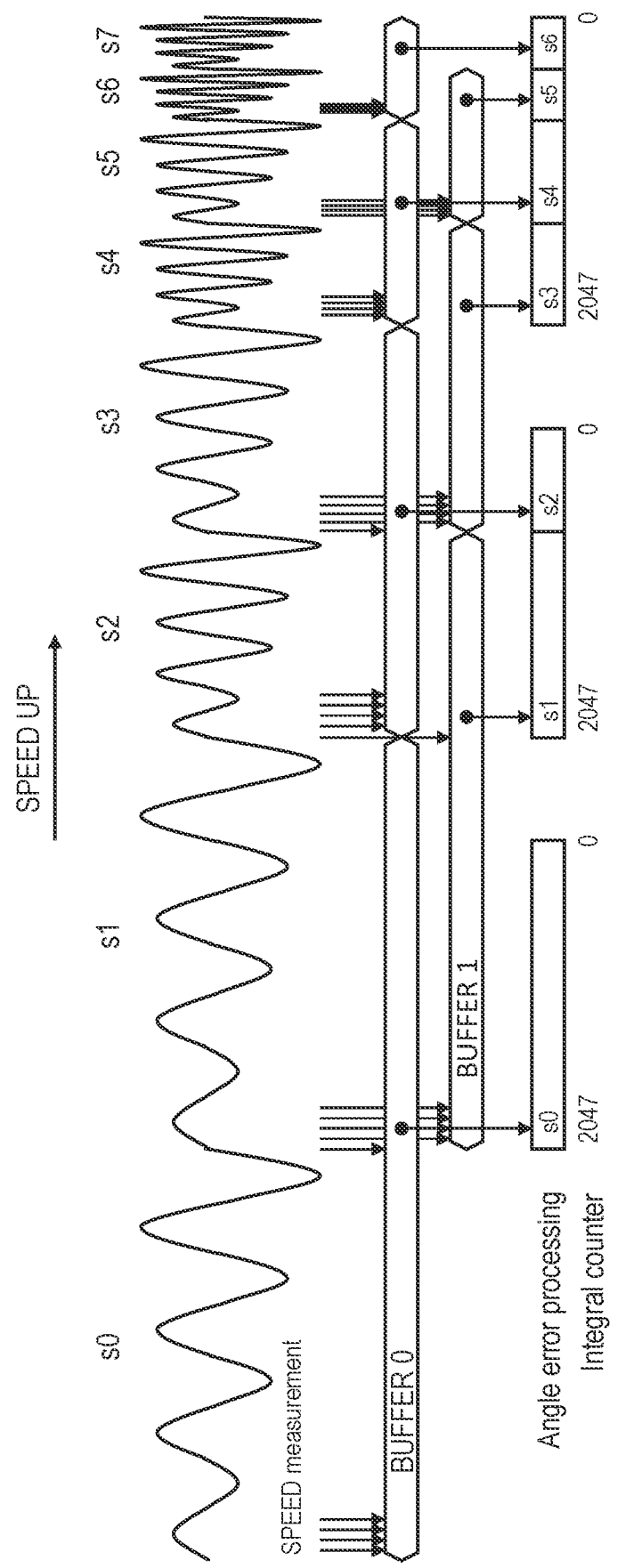
FIG. 11 is a timing chart for explaining the operation of the angle error correction device according to the third embodiment.

FIG. 11 is a timing chart for explaining the operation of the third embodiment. FIG. 11 shows that the rotation speed of the motor gradually increases.

First, the angle counter values of the rotation period s0 are stored in the buffer 0. End of the rotation period s0 (start of the rotation period s1), as a trigger that the mechanical angle has become 2π, the angle error detector 306, based on the angle counter values of the rotation period s0 stored in the buffer 0, starts to generate the angle error table for s0. The integral counter 1001 starts down-counting from "2047". While the angle error table for s0 is generated, the angle counter values for rotation period s1 are stored in the buffer 1. When the generation of the angle error table for s0 is completed, the integral counter 1001 becomes the count "0".

Next, in the end of the rotation period s1 (start of the rotation period s2), as a trigger that the mechanical angle has become 2π, the angle error detector 306, based on the angle to counter values of the rotation period s1 stored in the buffer 1, starts to generate the angle error table for s1. The integral counter 1001 starts down-counting from "2047". In parallel, the angular counter values of the rotation period s2 are stored in the buffer 0.

After the rotation period s2, since the rotational speed of the motor is high, before completion of the angle error table for s1 (integral counter 1001 is a count "0"), the rotation period s2 ends (rotation period s3 starts). In this case, in the third embodiment, the actual speed calculator 303, the curve interpolation circuit 304, the ideal speed estimator 305 perform each process using the angle counter value of the rotation period s2 stored in the buffer 0 as the angle counter value corresponding to the integral counter 1001. For example, it is assumed that the rotation period s2 of the integral counter 1001 ends at the time of the count "1000". In this case, the angle counter values from the machine angle 2π/2048 (corresponding to the count value "2047") to the mechanical angle 2π*(2048−1000; 2048 (corresponding to the count value "1000") are read out from the buffer 1. The angle counter values from the mechanical angle 2π*(2048−999)/2048 (corresponding to the count value "999") to the mechanical angle 2π (corresponding to the count value "0") are read out from the buffer 0. As a result, the angle error table is generated for the second time so that the measured values in the rotation periods s1 and s2 are reflected.

The same applies to the rotation period s3. The angle error table is generated for the third time so that the measured values in the rotation periods s3 to s6 are reflected.

In the third embodiment, although the measurement values at a plurality of rotation periods are reflected in one angle error table, there is little effect on the calculated angle error values. Because, as described in FIG. 2, the angular error is dependent on the angle, since it can be said that the error is almost the same if the angle is the same even if the rotation period is different.

It is needless to say that the integral counter 1001 may be an up-count instead of a down-count.

As described above, in the angle error correction device 13b according to the third embodiment, one angle error table is generated by measurement values in a plurality of rotation periods. Thus, in addition to the effect of the first embodiment, it is possible to follow the high-speed rotation of the motor without speeding up the circuit.

Note that the third embodiment can be combined with the second embodiment.

Fourth Embodiment

Figure 12:
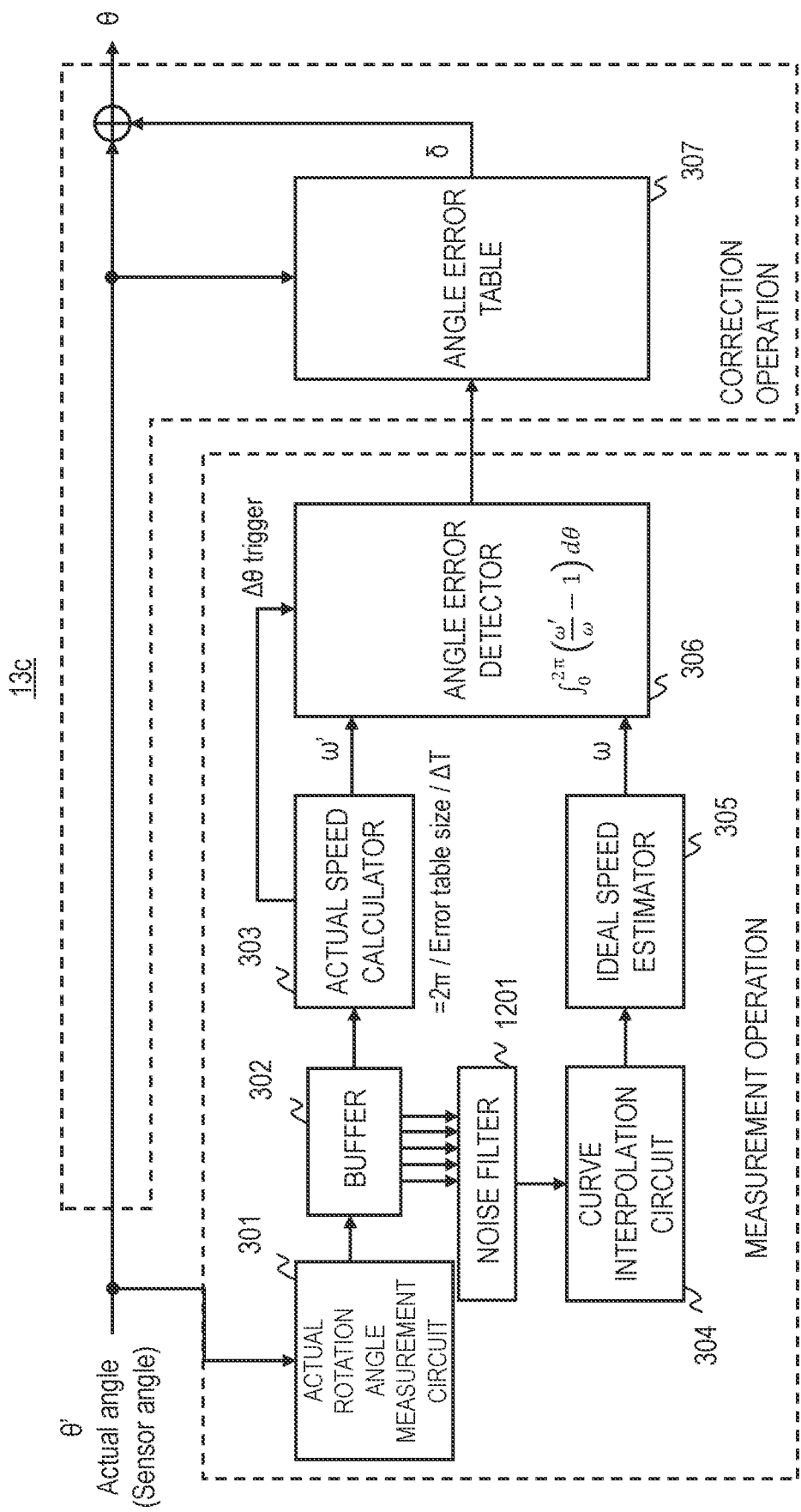
FIG. 12 is a block diagram of an angle error correction device according to a fourth embodiment.

FIG. 12 is a block diagram of an angle correction device 13c according to fourth embodiment. A difference from the first embodiment is that the noise filter 1201 is added.

Figure 13:
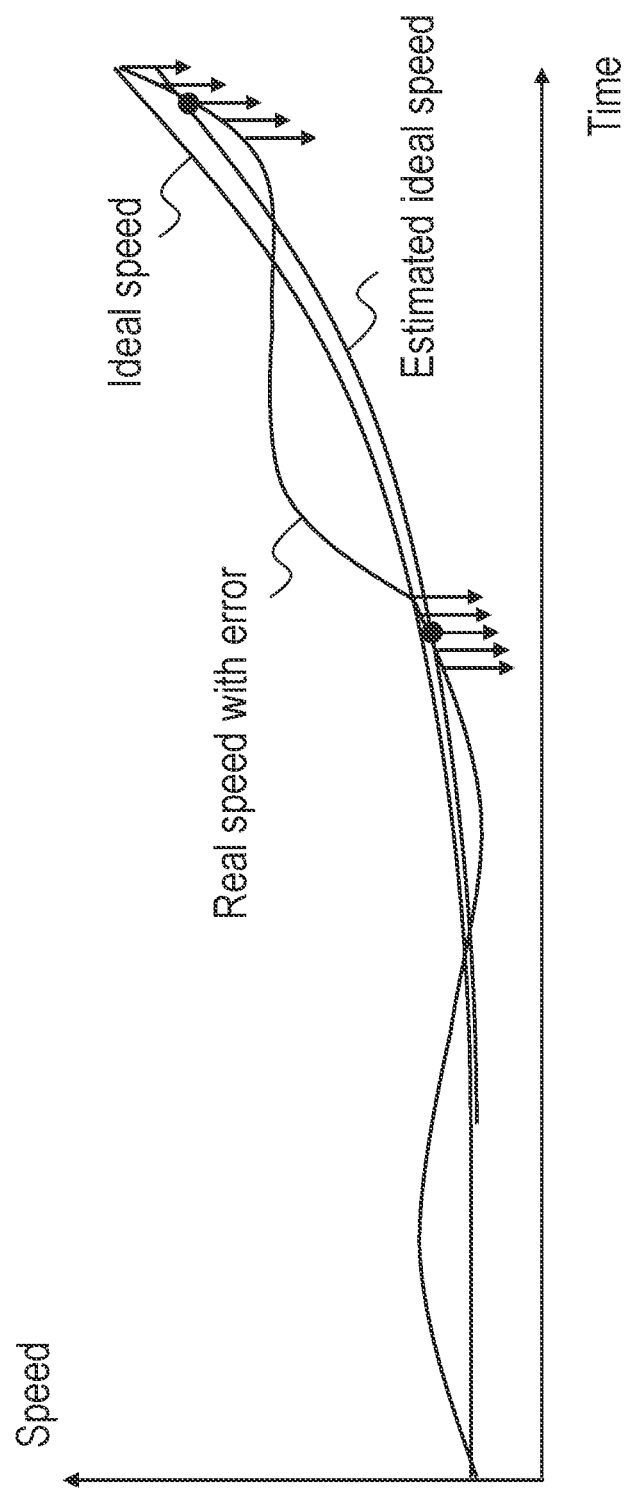
FIG. 13 is a diagram for explaining the operation of the angular error correction device according to the fourth embodiment.

In the first embodiment, in order to determine the estimated ideal rotational speed ω, the angle counter value corresponding to the specific angle is used. However, this angle counter value may be affected by sudden noise. Therefore, in the fourth embodiment, the angle counter value corresponding to the specific angle is an average value of a plurality of angle counter values corresponding to before and after the specific angle. For example, an average value of the five angle counter values (one angle counter value of the specific angle, two angle counter values before the specific angle, two angle counter values after the specific angle) is used as the angle count value of the spec angle. This eliminates abrupt noise. Noise filter 1201 is for performing the average value processing. FIG. 13 an operation image diagram.

As described above, in the angle error correction device 13c according to the fourth embodiment, in addition to the effect of the first embodiment, the influence of noise can be removed.

Note that the fourth embodiment can be combined with the second and third embodiments as well as the first embodiment.

Fifth Embodiment

Figure 14:
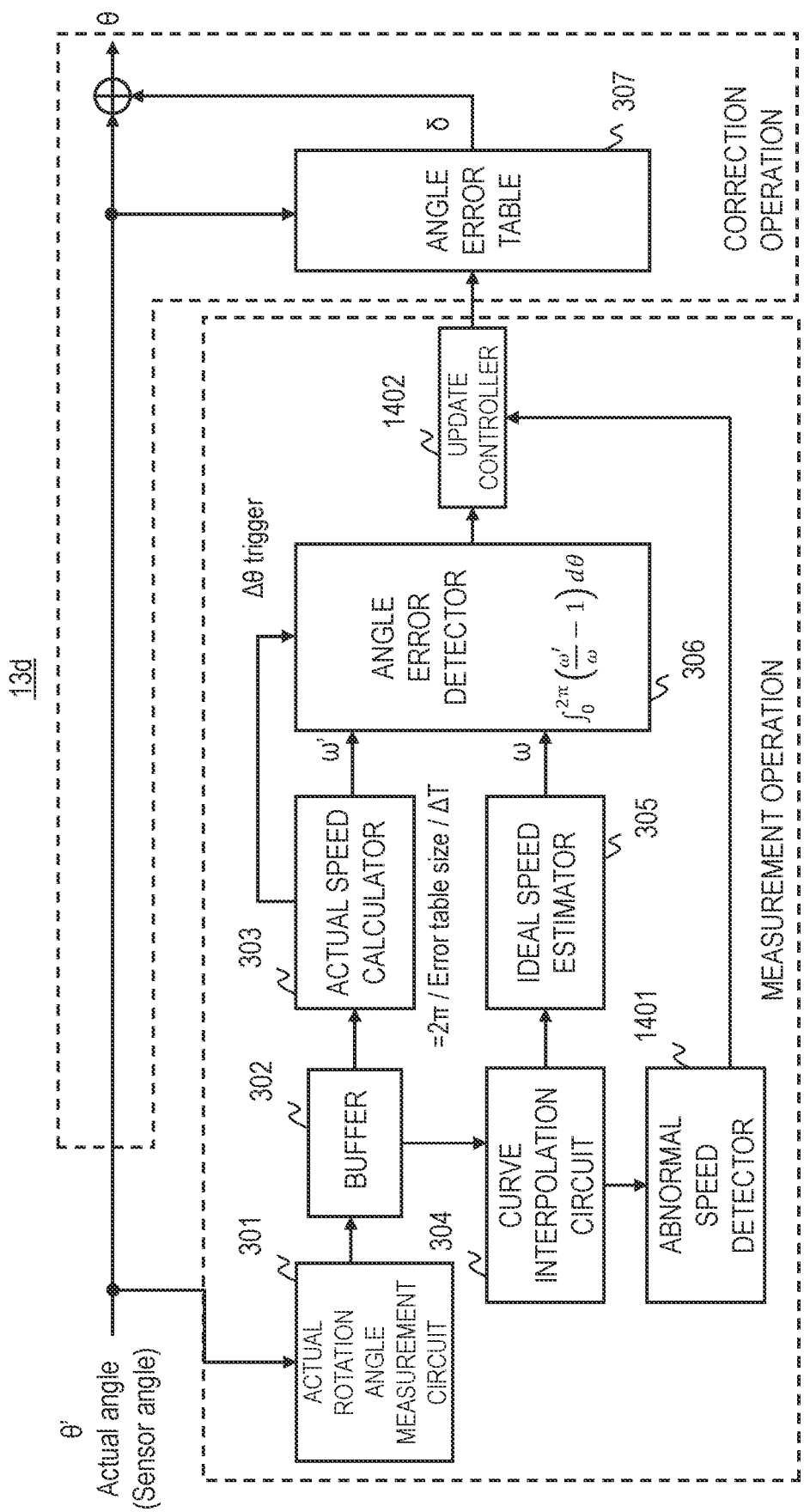
FIG. 14 is a block diagram of an angle error correction device according to a fifth embodiment.

FIG. 14 is a block diagram of an angle error correction device 13d according to the fifth embodiment. A difference from the first embodiment is that an abnormal speed detector 1401 and an update controller 1402 are added.

As described above, in the first embodiment, it is possible to suppress the error caused by the rapid acceleration and deceleration of the motor. However, further countermeasures are necessary for acceleration/deceleration exceeding a limit. In the fifth embodiment, it provides a further countermeasure technique against rapid acceleration and deceleration.

Abnormal speed detector 1401 calculates a rotational acceleration from the current rotational speed and the rotational speed of one cycle before owned by the curve interpolation circuit 304. If the calculated rotational acceleration indicates rapid acceleration or deceleration, the abnormal speed detector 1401 instructs the update controller 1402 to stop updating. Further, even if the current rotation speed is low, the abnormal speed detector 1401 instructs the update controller 1402 to stop updating. The state (rapid acceleration, rapid deceleration, low speed) may be determined by comparing the rotational acceleration and rotational speed with a threshold value set in advance.

Performing the abnormality determination with respect to the low speed is needed because the timer for counting the angle counter value will overflow when the rotation speed is too slow. In this case, the angle counter value cannot be obtained. The threshold for acceleration may set the maximum value of the angle accuracy requirement range required for the angle error correction device 13d.

The update controller 1402 stops the update of the angle error table 307 when the update stop instruction is received. Alternatively, the update controller 1402 may limit the angle error table update value. Alternatively, the update controller 1402 may add a filter (to limit the update deviation as the acceleration increases) to the update value of the angle error table.

As described above, the angle error correction device 13d according to the fifth embodiment can eliminate the influence on the angle error table at the time of rapid acceleration, rapid deceleration, and low speed of the motor.

It should be noted that the fifth embodiment can be combined with the second to fourth embodiments as well as the first embodiment.

Sixth Embodiment

Figure 15:
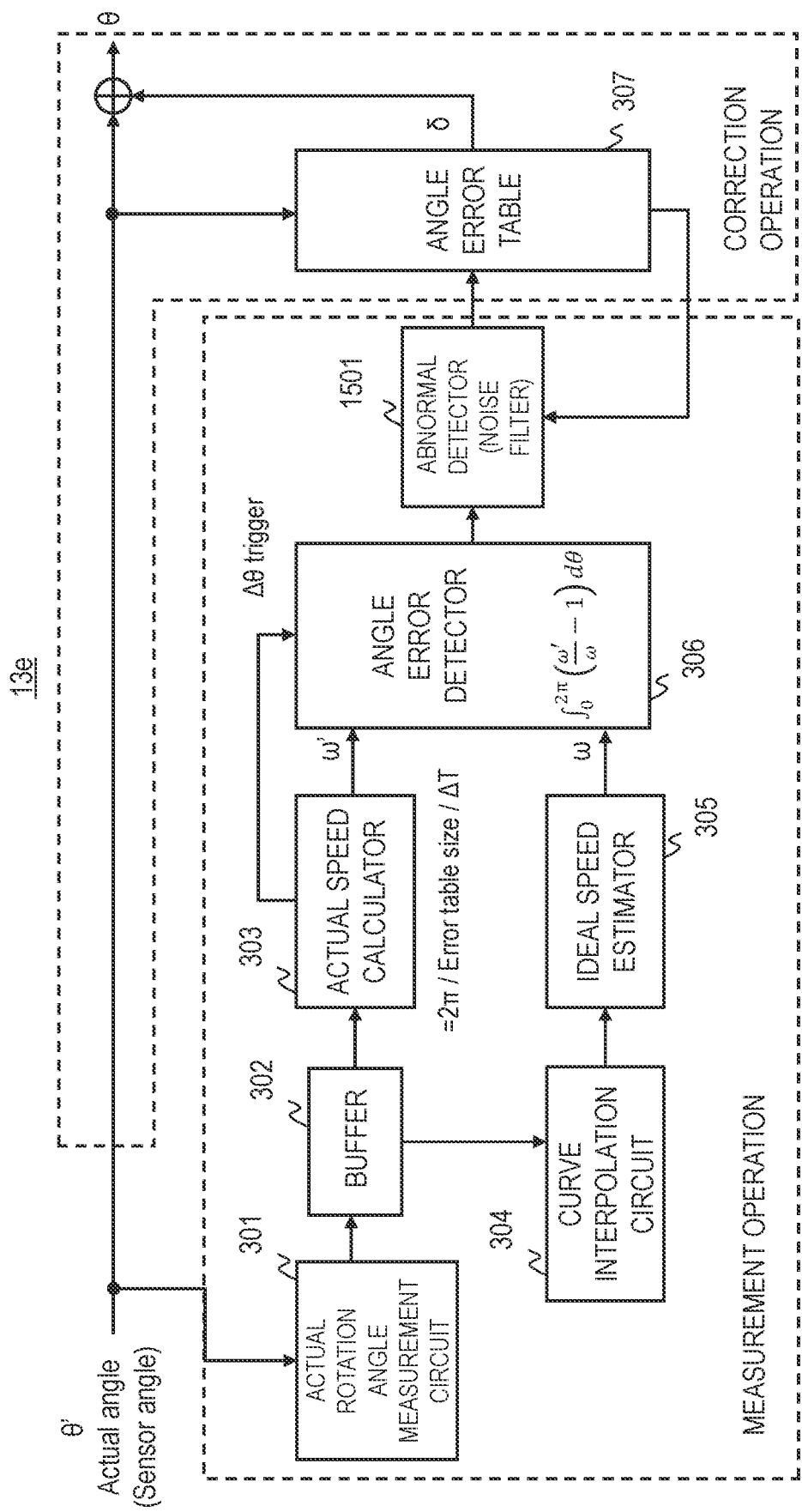
FIG. 15 is a block diagram of an angle error correction device according to a sixth embodiment.

FIG. 15 is a block diagram of an angle error correction device 13e according to the sixth embodiment. A difference from the first embodiment is that an abnormal detector 1501 is added. The abnormal detector 1501 has the following two functions.

1. Update Error Detection

When the error value (angle error update value) for updating the angle error table exceeds a preset threshold (e.g., ±0.5 rad), an error is output. When the error is output, the error correction function of the angle error correction device 13e is disabled. For example, by set a value obtained by summing the maximum value of the various errors as the threshold for rotation angle at which the motor becomes uncontrollable (step-out), it is possible to avoid a dangerous state.

2. Noise Rejection

The angle error update value is limited or filtered so that a difference between the angle error value stored in the angle error table and the angle error update value does not exceed a preset limit value. This operation is performed when the angle error table is stabilized after a predetermined time has elapsed from a start of the operation. This is because an update frequency for the angle error table is low in the initial state or step response of the motor. Finally, the noise can be removed, and the operation can be stabilized. However, if this limit value is continuously exceeded after the stabilization, it may be judged as abnormal.

As described above, in the angle error correction device 13d according to the sixth embodiment, in addition to the effect of the first embodiment, it is possible to detect an anomaly in the angle error update value and remove noise.

Note that the sixth embodiment can be combined with the second to fifth embodiments as well as the first embodiment.

It should be noted that the present invention is not limited to the above-mentioned embodiments, and various modifications can be made without departing from the gist thereof.

What is claimed is:

1. An angle detection system comprising:
   an angle sensor that detects a rotation angle of a motor;
   an angle converter that converts an output signal from the angle sensor to rotation angle information of the motor; and
   an angle error correction device that corrects the rotation angle information of the motor, the angle error correction device comprising:
      a central processing unit (CPU) configured to function as:
         an actual rotation angle measurement circuit that converts the rotation angle information of the motor to an angle counter value for each predetermined angle;
         an actual speed calculator that calculates an actual rotation speed for each predetermined angle from the angle counter value;
         a curve interpolation circuit that generates a curve interpolation equation from the angle counter value;
         an ideal speed estimator that calculates an estimated ideal rotation speed for each predetermined angle using the curve interpolation equation;
         an angle error detector that calculates an angle error for each predetermined angle by integrating an angle ripple ratio determined by the actual rotation speed and the estimated ideal rotation speed;
         an angle error table in which the angle error calculated by the angle error detector is stored; and
         a correction circuit that corrects the rotation angle information of the motor using the angle error table,
   wherein the curve interpolation circuit generates the curve interpolation equation from the angle counter values for three periods of a specific angle,
   wherein the angle error table is updated every one rotation period of the motor,
   wherein the predetermined angle is an angle obtained by dividing one rotation of the motor by n (n is an integer of 2 or more),
   wherein the angle error table has n angle errors,
   wherein the angle error correction device further comprises first and second buffers,
   wherein the actual rotation angle measurement circuit alternately stores the angle counter value for each predetermined angle in the first and second buffers every one rotation period, and
   wherein the actual speed circuit, the curve interpolation circuit and the ideal speed estimator switch between the first buffer and the second buffer for each one rotation period to read the angle counter value.

2. The angle detection system according to claim 1, wherein the angle error correction device further comprises:
   a division circuit that calculates an average value of the angle errors for the one rotation period calculated by the angle error detector,
   wherein the average value is subtracted from a first angle error calculated by the angle error detector in a next rotation period.

3. The angle detection system according to claim 1, wherein the angle error correction device further comprises:
   a division circuit that calculates an average value of the angle errors for the one rotation period calculated by the angle error detector and calculates a divided value by dividing the average value by n,
   wherein the divided value is subtracted from each of the n angle errors calculated by the angle error detector in a next rotation period.

4. The angle detection system according to claim 1, further comprising:
   a buffer that stores the angle counter value.

5. The angle detection system according to claim 1, wherein the CPU is further configured to function as:
   an integral counter that is counted every time the angle error detector calculates the angle error, and
   wherein the actual speed circuit, the curve interpolation circuit and the ideal speed estimator start to read the angle counter value corresponding to the m from the first or second buffer after switching when the integral counter indicates m (m is an integer that $0<m<n$) at the timing of the one rotation period.

* * * * *